May 19, 1970  L. L. EMMEL ET AL  3,513,045
METHOD OF MAKING FLAT ELECTRICAL CONDUCTOR CABLE
Filed Nov. 14, 1966  2 Sheets-Sheet 2
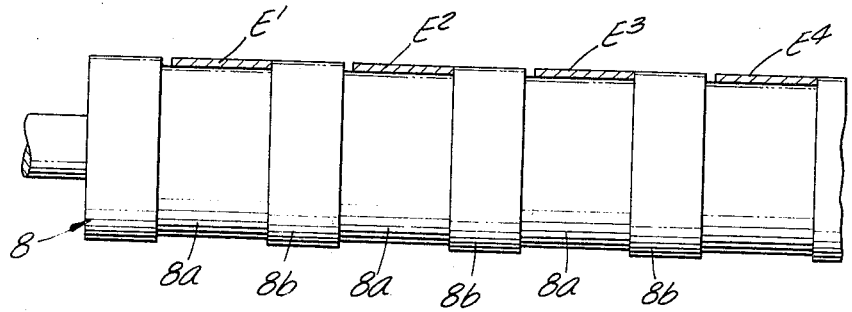
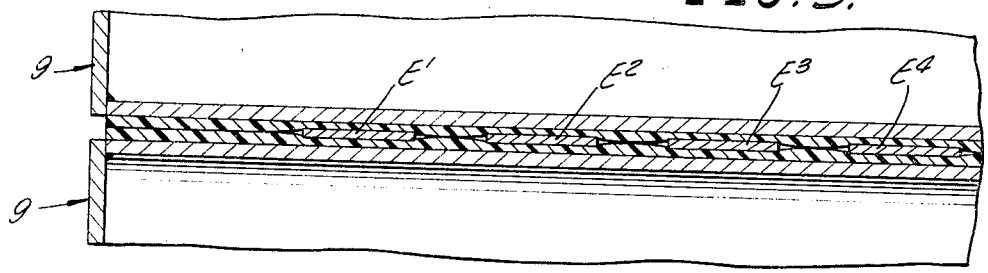
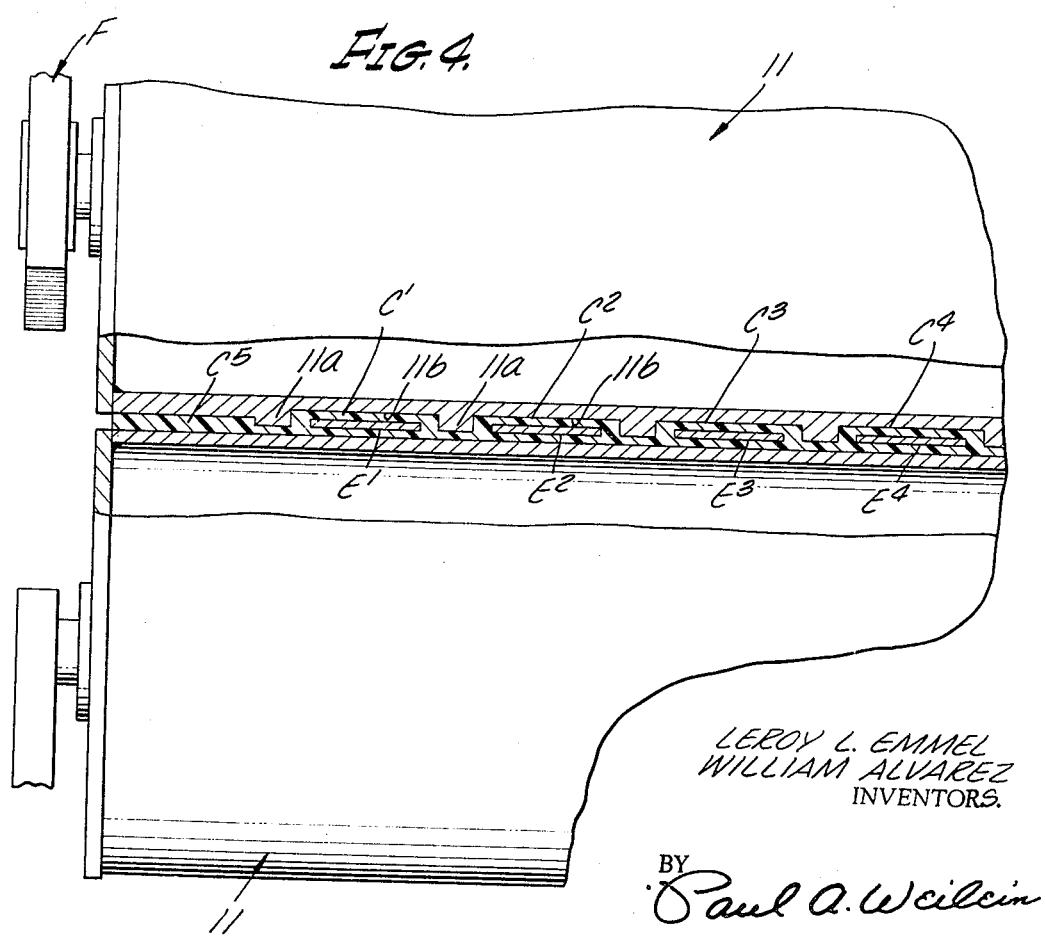
LEROY L. EMMEL
WILLIAM ALVAREZ
INVENTORS.
BY Paul A. Weilein
ATTORNEY United States Patent Office 3,513,045
Patented May 19, 1970

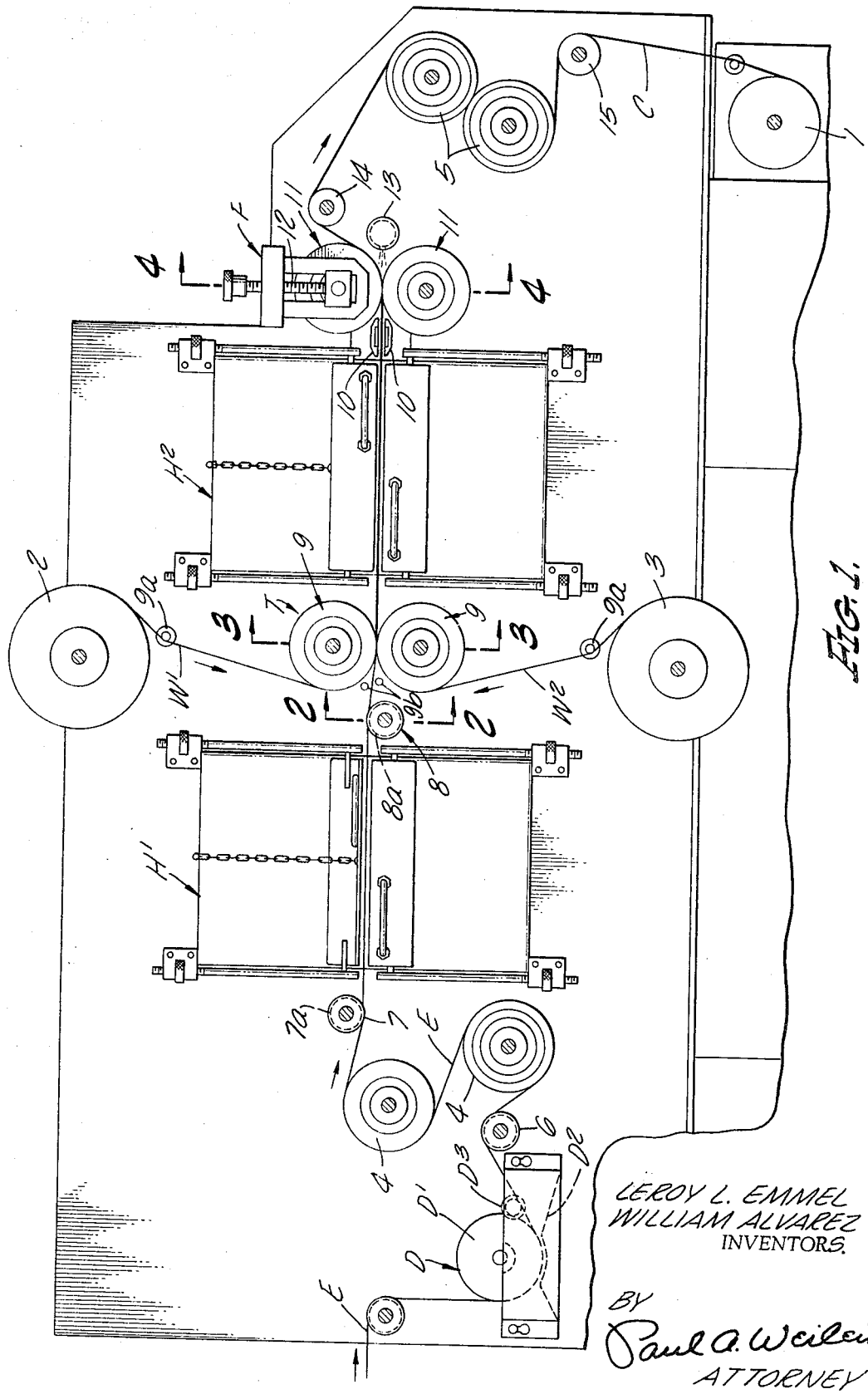

3,513,045
METHOD OF MAKING FLAT ELECTRICAL
CONDUCTOR CABLE
Leroy L. Emmel, Inglewood, and William Alvarez, Placentia, Calif., assignors to Haveg Industries, Inc., Wilmington, Del., a corporation of Delaware
Filed Nov. 14, 1966, Ser. No. 594,099
Int. Cl. H01b 13/06
U.S. Cl. 156—55                                11 Claims

ABSTRACT OF THE DISCLOSURE

A method for making flat electrical conductor cable having a plurality of conductor elements encased in an insulating sheath. First and second plastic webs of material are fed toward a tacking station. Simultaneous with the feeding of the first and second plastic webs, at least one electrical conductor is fed to the tacking station. The webs, before reaching the tacking station, are heated so that the confronting surfaces are raised above their melting temperature and so that these surfaces become tacky. The electrical conductor is then sandwiched between the plastic webs, the confronting surfaces of the webs being joined together. The sandwiched assembly is then heated and finally fed to a pair of rolls maintained at a temperature below that at which the plastic material is tacky. The cool rolls exert a laminating pressure on the sandwiched assembly and thereby serve the dual and simultaneous functions of shaping the sandwiched assembly into the desired final shape and solidifying the assembly in its final shape.

---

The present invention relates to the manufacture of conductor cables which typically comprise a number of longitudinally extended transversely spaced conductor ribbons or elements encapsulated within an insulating sheath. The conductor elements may be composed of any suitable electroconductive material which also exhibits the other necessary qualities of flexibility and strength, an example of which is copper, and the cross sectional form of the conductor elements while ordinarily being rectangular, i.e., thin flat ribbons, may be other than rectangular and various arrangements of the conductor elements may be provided. The insulating material of such flat conductor cables is generally of the Teflon, polyester, or polyvinyl chloride plastics which are either thermoplastic or may be coated with a thermoplastic or thermosetting adhesive so that the conductor elements may be sandwiched between webs of the insulating material, and the sandwich unitized by the application of heat and pressure to the sandwich. In some instances the flat conductor cable may be insulated only at one side of the conductor elements.

More particularly, the present invention relates to a method of manufacturing such flat conductor cable whereby superior control is obtained in respect of the positioning of the conductor elements within the insulating material, both during the initial sandwiching of the material as well as during the final application of heat and pressure whereby the sadnwiched plastic webs and conductor elements are finally unitized.

Apparatus and methods heretofore available for effecting lamination or sandwiching of conductor elements or ribbons in laterally spaced relation within the insulating webs have typically involved the application of heat and pressure to the sandwiched conductor elements and plastic webs in hot roll machines, the rolls being suitably grooved when desired to provide a desired cross sectional configuration to the unitized flat cable. Inasmuch as pressure is being applied to the plastic webs, particularly in the case of thermoplastic webs while the webs are elevated in temperature to a state of plastic flowability, the rolls have been jacketed with a non-stick material. Likewise, when adhesive bonding agents are employed to adhesively bond together layers of insulating material, the rolls have been jacketed with non-stick material. The non-stick material serves to prevent sticking of the plastic material or the adhesive to the pressure applying rolls. Such jackets have been composed of, for example, silicon rubber which is short lived at high temperatures, thus resulting in frequent roll changes. In addition, these prior hot roll processes and apparatus have employed a sequence of steps involving the heating, pressing, and freezing (solidifying) of the plastic material, which result in low quality and dimensional control, due to the entrapment of air within the insulating sheath and the loss of proper spacing of the conductor elements as a consequence of material shrinkage. These latter problems were primarily due to the fact that the sandwiched plastic material and conductor elements are subjected to forming pressure between the rolls which heat the material, and due to the freezing of the heated conductor cable so that the plastic material solidifies at a location in which the cable is unconstrained and the relationship between conductor elements has not been stabilized.

Accordingly, among the objects of the present invention is the provision of a method of manufacturing flat conductor cable which solves the aforementioned problems and is productive of flat conductor cable of superior dimensional accuracy, maintaining proper spatial relation between conductor elements as well as a uniform bond and encapsulation of the coductor elements within the insulated sheath.

In addition to the foregoing, the method of the present invention enables the production of flat conductor cable at a more rapid rate than the machines and methods heretofore available.

In accomplishing the foregoing, it is a more specific object to provide a method of making flat conductor cable wherein a number of transversely spaced conductor elements are drawn from a source thereof by take-up rolls which apply tension to the conductor elements as well as to the finished conductor cable. A station is provided at which the conductor elements are preheated; as the conductor elements leave the preheating station, they are passed under tension over a roll which is adapted to establish precise lateral corelationship between the conductor elements in advance of a tacking station. At this tacking station the prelocated conductor elements are sandwiched between a pair of plastic webs which are supplied from separate sources and which are drawn into the tacking station past heating elements which are so disposed as to make tacky the surfaces of the webs which will ultimately be in mutually confronting relation with the conductor elements therebetween. This is to say that, if the plastic webs are composed of thermoplastic material such as Teflon, these ultimately mutually confronting surfaces will be preheated to a state of thermoplastic tackiness while if an adhesive is applied to such surfaces the initial heating will render the adhesive tacky. The tacky web surfaces and the prepositioned electrical conductors are then drawn between rolls in this tacking station which will apply tacking pressure as the then sandwiched assembly passes to a heating station. At this heating station the webs are elevated in temperature to a state at which they are capable of pressure formation.

The thermoplastic sandwich is then passed into a freezing station at which a forming pressure is applied while the conductor elements are tensioned and in proper laterally spaced relation and the temperature of the thermoplastic material is reduced so as to freeze or cause solidification of the web material, thus completing the formation of a continuous flat conductor cable of superior quality and dimensional consistency.

Other objects and advantages of the invention will be hereinafter described or will become apparent to those skilled in the art, and the novel features of the invention will be defined in the appended claims.

In the accompanying drawings:

FIG. 1 is a side elevational view generally illustrating an apparatus useful in the practice of the method of the present invention;

FIG. 2 is an enlarged fragmentary detail view as taken on the line 2—2 of FIG. 1 and showing in elevation the conductor elements spacing roll and in section the spaced conductor elements;

FIG. 3 is an enlarged fragmentary detail view in section as taken on the line 3—3 of FIG. 1 showing the confronting rolls in the tacking station and the tacked sandwich of conductor elements and insulating webs;

FIG. 4 is an enlarged fragmentary view as taken on the line 4—4 of FIG. 1 and showing the confronting pressure applying and freeze rolls with the conductor cable pressed therebetween into its final form.

Like reference characters in the several views of the drawings and in the following description designate corresponding parts.

The apparatus illustrated herein for the practice of the present method includes a machine into which, from a source not shown, will be supplied a suitable number of electrical conductor ribbons or wires in the form of continuous elements E, and from which a finished flat conductor cable C will be wound upon a winding roll 1. The conductor cable C will consist of the conductor elements sandwiched between a web W1 which is pulled from a supply reel 2 and a web W2 pulled from a supply reel 3. It will be understood that the webs W1 and W2 may be of a desired or convenient width so as to accommodate a suitable number of the electrical conductors E in transversely spaced relationship and that the webs may be composed of any of the useful insulating plastic materials which are thermoplastic and which may be thermoplastically bonded together or united or which may be under heat and pressure bonded together by the heat responsive adhesive. Included within these materials are Teflon materials, polyesters, and polyvinyl chloride materials, as are well known in the art.

In the apparatus heretofore available it has been the practice to supply the electrical conductors E and webs W1 and W2 as just described above to heat and pressure applying rolls of special non-stick construction and to wind the tape in a continuous length upon a take-up reel such as the reel 1, but such prior apparatus has not been altogether satisfactory in respect of dimensional accuracy and product stability.

In accordance with the present invention, the method contemplates the provision of means for maintaining the conductor elements E under tension throughout the cable making operation. Thus, there is disclosed a pair of braking rolls 4 over which the conductor elements E are pulled by a pair of power rolls 5 driven by the machine and located in horizontally spaced relation to the braking rolls 4.

As the conductor elements E are being pulled by the power rolls 5 and prior to the passage of the conductor elements over the braking rolls 4, the conductor elements pass through a degreasing or washing station D at which the conductor elements are forced through a degreasing bath by a main roll D1, the bath containing a bottom pad D2 and an upper wiping roller D3 for effecting a wiping of the conductor elements as they pass through the degreasing station and onto the braking rolls 4. Between the degreasing station and the braking rolls 4 is an idling roll 6.

As the conductor elements E leave the braking rolls 4 and move to the right, as shown by the arrows, the elements E are engaged by an idler roll 7 which is mounted on a shaft in such a location as to cause downward deflection of the conductors E so as to maintain tension thereon and, if desired, the idler 7 may be provided with suitable longitudinally spaced circumferential grooves 7a which will serve to initially position the conductor elements in laterally spaced relation to one another across the extent of the idler roll 7.

From the idler 7 the conductor elements E pass into a preliminary heating station H1 of a conventional type, herein illustrated as being a hinged oven, having electrical heating elements therein for progressively raising the temperature of the conductor elements as they pass through the preliminary heating station H1. As the conductor elements leave the heating station H1 they pass over an idler roll 8 having axially spaced, circumferential grooves 8a which establish or maintain the relative lateral spacing of the conductor elements, four of which are shown in the form of flat conductor ribbons E1, E2, E3, and E4 in FIG. 2, seating in the grooves 8a of the idler roll 8 and by the intervening lands 8b precisely laterally prepositioned preliminary to entry into the tacking station T.

At the tacking station T the degreased, preheated and prepositioned conductor elements E are to be initially tacked to or within the insulating material comprising the webs W1 and W2 referred to above, between a pair of pressure applying rolls 9 which confront one another at an elevation slightly below the elevation at which the elements E pass over the positioning roll 8, again so as to maintain the elements under proper tension. Lateral positioning of the webs relative to the conductor elements is effected by guide collars 9a mounted on shafts intermediate the web supply rolls 2 and 3 and the respective tacking rolls 9.

Adjacent each of the rolls 9 at the tacking station is a heating element 9b. These heating elements 9b are adapted to initially heat the surface of the respective webs W1 and W2, which will constitute the confronting faces thereof as the process progresses, just prior to the entry of the webs between the tacking rolls 9. In this connection, the heating elements 9b are disposed respectively above and below the conductor elements E just prior to their coengagement between the webs W1 and W2 so that the heating elements 9b also serve to maintain the elevated temperature of the conductor elements. The webs W1 and W2 with their confronting faces rendered tacky or slightly plastic by the heating elements 9b as they enter between the tacking rolls 9 and engage the conductor elements E are thus initially tacked together due to plastic flow under pressure applied by rolls 9, as best seen in FIG. 3, with the conductor elements seating in the plastic material in proper position to form a sandwich in which the lateral spacing between the conductor elements E1 through E4 is precisely established by the roll 8 due to the fact that the conductor elements are, as previously mentioned, maintained under tension in the grooves 8a. If adhesive bonding material is employed on the webs, an adhesive bond with the conductor elements will also be established.

From the tacking station the sandwiched cable C now passes through a heating station H2 which, like heating station H1, consists of a conventional hinged oven having electric heating elements. During the travel of the sandwiched cable through the heating station H2, the temperature of the sandwich will be progressively elevated by the heating elements until the thermoplastic webs or adhesive material on the confronting faces of the webs will be conditioned for final forming of the cable at a solidifying or freezing station generally denoted at F. However, in order to assure the maintenance of the elevated temperature of the cable just prior to its entry into the freezing station F, the heating station H2 further includes a pair of electric heating elements 10 disposed above and below the cable as it leaves the oven of heating station 2 and passes into the freezing station.

This freezing station F includes a pair of pressure applying rolls 11 at least one of which is provided with means 12 for adjusting the pressure including an adjustor screw mechanism for adjusting the shaft of one roll 11 relative to the other so as to apply the desired forming pressure to the heated sandwich as it passes through the rolls. These rolls 11 may be water cooled, i.e., they may contain a body of water therein, or otherwise the temperature of the rolls may be sufficiently less than the temperature of the heated sandwich as it enters the rolls as to reduce the temperature of the webs W1 and W2 to a level at which so-called freezing takes place. For example, if the web material is heated to 600° F. to render it plastic, the freeze rolls may be at a temperature on the order of 200° F. so that the plastic material will set as it passes between rolls 11 under pressure. Cool air jetting means 13 may be placed so as to apply a cooling air jet to the rolls and the cable as it leaves the rolls. Alternatively, the rolls 11 may be refrigerated or water cooled to a desired temperature.

Referring to FIG. 4, it will be noted that the rolls 11 are suitably formed so as to shape the plastic material as the webs W1 and W2 are unitized. Thus, the rolls or one of them, as in the illustrative embodiment, may be provided with axially spaced ribs 11a and grooves 11b which form the cable insulation and compress the plastic material as it is freezing so as to confine the conductor elements E1 through E4 in ribs C1, C2, C3, and C4 and thereby confine the conductors in precise spaced locations. Such compression of the plastic material also eliminates voids or air pockets therein.

At the lateral edge of the insulating webs between the freeze rolls 11, a marginal portion C5 may be formed without a conductor element therein and later trimmed off to provide a desired margin width. Lateral deformation at the ultimate edges of the sandwich is prevented by confinement of the web material between the laterally outermost ribs 11a on the rolls 11. The cable C is maintained in contact with at least one of the freeze rolls F by an idler roll 14 which is offset from the plane of the cable as it passes between rolls 11 so as to hold the cable against the upper roll 11.

From the idler roll 11 the cable C passes to the power rolls 5 referred to above, thence over an idler roll 15 and onto the take-up roll 1. Between the idler roll 14 and the power rolls 5, or elsewhere as desired, suitable cutting means such as a knife (not shown) may be employed to progressively sever the margin from the cable or otherwise cut the same between conductor elements.

From the foregoing, it will now be apparent that the invention provides a flat conductor cable manufacturing method which keeps the conductor elements and the plastic webs under positional control and that the thermoplastic material is pressed and shaped during the freezing or solidifying operation, thereby eliminating the need for non-stick rollers and more particularly the cable is frozen in a formed and confined state so that the problems of shrinkage and conductor position change have been obviated.

While the specific details of the present invention have been herein shown and described, as well as the specific details of the articles to be made thereby, and the description has been predicated on the use of the method for making electrical conductors, it will be understood that changes and alterations may be made without departing from the spirit of the invention and that in this connection the method may be employed for making plastic covered longitudinally extended elements which are useful for purposes other than electrical conductors.

We claim:
1. A method for making a laminate comprising the steps of: bringing first and second webs into association with one another; bringing a member to be sandwiched between said webs into association with said webs so that the member is positioned intermediate the confronting surfaces of the webs; applying heat to the assembly of the member and the webs so that the confronting surfaces of the webs become tacky; positioning the assembly between a pair of pressure elements, which pressure elements are maintained at a temperature sufficiently below the temperature at which the confronting surfaces of the webs become tacky so that the confronting surfaces of the webs solidify; and applying pressure to the webs by means of said pressure elements to solidify the confronting surfaces of the webs, thereby effecting a laminate.

2. The method as recited in claim 1, wherein the confronting surfaces of the first and second webs are in the form of thermo-responsive adhesives.

3. The method as recited in claim 1, wherein the confronting surfaces of said first and second webs are of the same material.

4. The method as recited in claim 1, wherein the pressure elements take the form of first and second pressure rolls.

5. The method for making conductor cable comprising the steps of interposing a plurality of conductor elements between first and second webs of plastic material, laminating the webs and conductor elements together by passing same between first and second pressure elements while the confronting surfaces of the respective webs are tacky, the improvement comprising: maintaining the pressure elements at a temperature sufficiently below the temperature at which the confronting surfaces of said first and second webs become tacky so that the confronting surfaces solidify while pressure is applied thereto, to thereby form a unitary laminate structure.

6. The method as recited in claim 5, wherein the confronting surfaces of the first and second webs are in the form of thermo-responsive adhesives.

7. The method as recited in claim 5, wherein the confronting surfaces of said first and second webs are of the same material.

8. The method as recited in claim 5, wherein the pressure elements take the form of first and second pressure rolls.

9. The method as recited in claim 8, wherein at least one of said pressure rolls is provided with a surface for molding the plastic webs and conductor elements into the desired final form and wherein means are provided to maintain the laminate in the desired final form until the laminate is sufficiently cooled so as to remain as shaped by the surface of the pressure roll.

10. The method as recited in claim 1, wherein a plurality of members are to be sandwiched between said webs and wherein said plurality of members are mutually parallel.

11. The method of claim 5, wherein said plurality of conductor elements are mutually parallel.

References Cited

UNITED STATES PATENTS

| | | | |
|---|---|---|---|
| 2,714,571 | 8/1955 | Irion et al. | 156—311 X |
| 2,963,538 | 12/1966 | Dahlgren | 156—306 X |
| 3,082,292 | 3/1963 | Gore | 156—55 X |
| 3,268,846 | 8/1966 | Morey | 174—117 X |
| 3,346,686 | 10/1967 | Collins | 156—306 X |

VERLIN R. PENDEGRASS, Primary Examiner

U.S. Cl. X.R.

174—117